United States Patent
Sun et al.

(10) Patent No.: US 10,803,851 B2
(45) Date of Patent: Oct. 13, 2020

(54) METHOD AND APPARATUS FOR PROCESSING SPEECH SPLICING AND SYNTHESIS, COMPUTER DEVICE AND READABLE MEDIUM

(71) Applicant: BAIDU ONLINE NETWORK TECHNOLOGY (BEIJING) CO., LTD., Beijing (CN)

(72) Inventors: Xiaohui Sun, Beijing (CN); Yu Gu, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 60 days.

(21) Appl. No.: 16/226,321

(22) Filed: Dec. 19, 2018

(65) Prior Publication Data

US 2019/0371291 A1    Dec. 5, 2019

(30) Foreign Application Priority Data

May 31, 2018  (CN) .......................... 2018 1 0552365

(51) Int. Cl.
  *G10L 13/027*    (2013.01)
  *G10L 13/08*    (2013.01)
  (Continued)

(52) U.S. Cl.
  CPC ............ *G10L 13/027* (2013.01); *G10L 13/08* (2013.01); *G10L 15/063* (2013.01); *G10L 25/30* (2013.01)

(58) Field of Classification Search
  CPC ........ G06F 3/16; G06F 3/167; G06F 21/6245; G06F 40/169; G06F 40/284;
  (Continued)

(56) References Cited

U.S. PATENT DOCUMENTS 7,082,396 B1 * 7/2006 Beutnagel ............... G10L 13/07
                                                            704/258
7,430,503 B1    9/2008 Walker
(Continued)

FOREIGN PATENT DOCUMENTS

CN    101350195 A    1/2009
CN    105304080 A    2/2016
(Continued)

OTHER PUBLICATIONS

Notice of Reasons for Refusal from JP app. No. 2018-239323, dated Feb. 4, 2020, with English translation from Global Dossier.
(Continued)

*Primary Examiner* — Gerald Gauthier
(74) *Attorney, Agent, or Firm* — Ladas & Parry, LLP

(57) ABSTRACT

The present disclosure provides a method for processing speech splicing and synthesis and apparatus, a computer device and a readable medium. The method comprises: expanding a speech library according to a pre-trained speech synthesis model and an obtained synthesized text; the speech library before the expansion comprises manually-collected original language materials; using the expanded speech library to perform speech splicing and synthesis processing. According to the technical solution of the present embodiment, the speech library is expanded so that the speech library includes sufficient language materials. As such, when speech splicing processing is performed according to the expanded speech library, it is possible to select more speech segments, and thereby improve coherence and naturalness of the effect of speech synthesis so that the speech synthesis effect is very coherent with very good naturalness and can sufficiently satisfy the user's normal use.

20 Claims, 3 Drawing Sheets

Expand a speech library according to a pre-trained speech synthesis model and an obtained synthesized text; the speech library before the expansion comprises manually-collected original language materials — 100

Use the expanded speech library to perform speech splicing and synthesis processing — 101

(51) Int. Cl.
*G10L 15/06* (2013.01)
*G10L 25/30* (2013.01)

(58) Field of Classification Search
CPC ....... G10L 13/027; G10L 13/04; G10L 13/08; G10L 13/10; G10L 15/063; G10L 15/16; G10L 15/22; G10L 21/00; G10L 21/06; G10L 25/30; G10L 13/00; G10L 13/02; G10L 13/033; G10L 13/047; G10L 13/06; G10L 15/04; G10L 15/1815; G10L 15/20; G10L 15/26; G10L 17/22; H04N 21/422; G06Q 10/06311; G09B 21/006; H04L 67/306; H04M 3/42068; H04R 1/323
USPC .................................. 704/9, 258, 260, 266
See application file for complete search history.

(56) References Cited

U.S. PATENT DOCUMENTS

| | | | | |
|---|---|---|---|---|
| 8,655,659 | B2* | 2/2014 | Wang | G10L 13/033 704/231 |
| 9,679,554 | B1* | 6/2017 | Czuczman | G10L 13/00 |
| 10,186,251 | B1* | 1/2019 | Mohammadi | G10L 13/0335 |
| 10,276,149 | B1* | 4/2019 | Liang | G10L 13/033 |
| 10,319,365 | B1* | 6/2019 | Nicolis | G10L 15/26 |
| 10,325,599 | B1* | 6/2019 | Naidu | G10L 15/28 |
| 10,332,517 | B1* | 6/2019 | Wang | G06F 3/167 |
| 10,339,925 | B1* | 7/2019 | Rastrow | H04L 67/306 |
| 10,418,033 | B1* | 9/2019 | Mutagi | G06F 16/635 |
| 10,446,147 | B1* | 10/2019 | Moniz | G06F 40/205 |
| 10,448,115 | B1* | 10/2019 | Jamal | H04N 21/4828 |
| 10,565,989 | B1* | 2/2020 | Wheeler | G06F 3/167 |
| 10,600,408 | B1* | 3/2020 | Smith | G10L 13/033 |
| 2003/0004723 | A1* | 1/2003 | Chihara | G10L 13/08 704/260 |
| 2003/0163316 | A1* | 8/2003 | Addison | G09B 19/04 704/260 |
| 2003/0171923 | A1* | 9/2003 | Yazu | G10L 13/08 704/260 |
| 2004/0030555 | A1* | 2/2004 | van Santen | G10L 13/08 704/260 |
| 2005/0027531 | A1* | 2/2005 | Gleason | G10L 13/06 704/260 |
| 2006/0129401 | A1* | 6/2006 | Smith | G10L 13/06 704/260 |
| 2007/0016422 | A1* | 1/2007 | Mori | G10L 13/08 704/260 |
| 2007/0033049 | A1* | 2/2007 | Qin | G10L 13/04 704/260 |
| 2008/0195391 | A1* | 8/2008 | Marple | G10L 13/10 704/260 |
| 2011/0046957 | A1* | 2/2011 | Hertz | G10L 13/06 704/266 |
| 2012/0065961 | A1* | 3/2012 | Latorre | G10L 13/07 704/9 |
| 2012/0316881 | A1* | 12/2012 | Kato | G10L 13/06 704/260 |
| 2012/0330667 | A1* | 12/2012 | Sun | G10L 13/08 704/260 |
| 2016/0306783 | A1* | 10/2016 | Wu | G06F 40/253 |
| 2017/0092259 | A1* | 3/2017 | Jeon | G10L 13/07 |
| 2017/0169811 | A1* | 6/2017 | Sabbavarapu | G10L 13/08 |
| 2017/0345411 | A1* | 11/2017 | Raitio | G10L 13/0335 |
| 2018/0096677 | A1* | 4/2018 | Pollet | G10L 13/08 |
| 2018/0122362 | A1* | 5/2018 | Li | G10L 13/10 |
| 2018/0211649 | A1* | 7/2018 | Li | G06F 40/169 |
| 2018/0247636 | A1* | 8/2018 | Arik | G10L 13/027 |
| 2018/0254034 | A1* | 9/2018 | Li | G10L 15/183 |
| 2018/0330713 | A1* | 11/2018 | Hoory | G10L 13/033 |
| 2019/0122691 | A1* | 4/2019 | Roy | H04R 1/40 |
| 2019/0318726 | A1* | 10/2019 | Jin | G10L 13/02 |
| 2019/0371291 | A1* | 12/2019 | Sun | G10L 13/06 |
| 2019/0371292 | A1* | 12/2019 | Gu | G10L 13/047 |

FOREIGN PATENT DOCUMENTS

| | | |
|---|---|---|
| CN | 106297766 A | 1/2017 |
| CN | 107393556 A | 11/2017 |
| JP | 2005292433 A | 10/2005 |
| JP | 2008545995 A | 12/2008 |
| JP | 20100237323 A | 10/2010 |
| JP | 2015052748 A | 3/2015 |

OTHER PUBLICATIONS

First Office Action and Search Report from CN app. No. 201810552365.3, dated Apr. 23, 2019, with English translation from Global Dossier.

* cited by examiner

METHOD AND APPARATUS FOR PROCESSING SPEECH SPLICING AND SYNTHESIS, COMPUTER DEVICE AND READABLE MEDIUM

The present application claims the priority of Chinese Patent Application No. 201810552365.3, filed on May 31, 2018, with the title of "Method and Apparatus for Processing Speech Splicing and Synthesis, Computer Device and Readable Medium". The disclosure of the above applications is incorporated herein by reference in its entirety.

FIELD OF THE DISCLOSURE

The present disclosure relates to the technical field of computer application, and particularly to a method and apparatus for processing speech splicing and synthesis, a computer device and a readable medium.

BACKGROUND OF THE DISCLOSURE

Speech syntheses is an important part of human-machine interaction. Commonly-used syntheses technologies includes two major classes: parameter synthesis based on statistics modeling and splicing syntheses based on unit selection. Since natural speech segments are employed, the quality of the splicing and synthesis technology is better, and therefore current commercial synthesis system mainly employ the splicing and synthesis method. Commonly-used commercial splicing and synthesis systems usually need to record tens of thousands of speeches, data reach a scale of over ten hours, and a lot of manpower is needed to perform data check and annotation, so that it may be ensured that any text can achieve an acceptable synthesis effect.

As for star speech synthesis and personalized synthesis scenarios, it is usually impossible to collect a lot of speech data. The reason is that the cost for recording star's speech is high, and it is impractical to record a large-scale corpus; regarding the personalized scenario, it is impossible to ask each user to record tens of thousands of speeches and then enable use of products. However, these scenarios are of great commercial value. The star speech synthesis may effectively improve concerns and propagation for products. The personalized synthesis enables use of the user's family member's speech or his own speech, improves the user's participation and freshness, and effectively improves the user's experience. In the current star speech synthesis and personalized synthesis scenarios, only language material data in a small amount can be collected in a speech library. Upon speech splicing, too few speech segments may be selected in the speech library, the speech synthesis effect is very incoherent, naturalness is undesirable, and the spliced speech substantially cannot be used normally.

SUMMARY OF THE DISCLOSURE

The present disclosure provides a method and apparatus for processing speech splicing and synthesis, a computer device and a readable medium, to improve coherence and naturalness of the effect of speech synthesis.

The present disclosure provides a method for processing speech splicing and synthesis, the method comprising:
expanding a speech library according to a pre-trained speech synthesis model and an obtained synthesized text; the speech library before the expansion comprises manually-collected original language materials;
using the expanded speech library to perform speech splicing and synthesis processing.

Further optionally, in the above-mentioned method, the expanding a speech library according to a pre-trained speech synthesis model and an obtained synthesized text specifically comprises:
using the speech synthesis model and obtained synthesized text to synthesize a synthesized speech corresponding to the synthesized text;
updating the speech library by adding the synthesized text and corresponding synthesized speech into the speech library as synthesized language materials.

Further optionally, the above-mentioned method, before expanding the speech library according to the pre-trained speech synthesis model and the obtained synthesized text, the method comprises:
training the speech synthesis model according to manually-collected original language materials in the speech library before expansion.

Further optionally, in the above-mentioned method, the original language materials comprise original texts and corresponding original speeches;
the training the speech synthesis model according to manually-collected original language materials in the speech library specifically comprises:
training the speech synthesis model according to the original texts and corresponding original speeches.

Further optionally, the above-mentioned method, before expanding the speech library according to the pre-trained speech synthesis model and the obtained synthesized text, the method comprises:
crawling the synthesized text from a network.

Further optionally, in the above-mentioned method, the speech synthesis model employs a WaveNet model.

The present disclosure provides an apparatus for processing speech splicing and synthesis, the apparatus comprising:
an expanding module configured to expand a speech library according to a pre-trained speech synthesis model and an obtained synthesized text; the speech library before the expansion comprises manually-collected original language materials;
a processing module configured to use the expanded speech library to perform speech splicing and synthesis processing.

Further optionally, in the above-mentioned apparatus, the expanding module is specifically configured to:
use the speech synthesis model and obtained synthesized text to synthesize a synthesized speech corresponding to the synthesized text;
update the speech library by adding the synthesized text and corresponding synthesized speech into the speech library as synthesized language materials.

Further optionally, the above-mentioned apparatus further comprises:
a training module configured to train the speech synthesis model according to manually-collected original language materials in the speech library before expansion.

Further optionally, in the above-mentioned apparatus, the original language materials comprise original texts and corresponding original speeches;
the training module is specifically configured to train the speech synthesis model according to the original texts and corresponding original speeches.

Further optionally, the above-mentioned apparatus further comprises:
a crawling module configured to crawl the synthesized text from a network.

Further optionally, in the above-mentioned apparatus, the speech synthesis model employs a WaveNet model.

The present disclosure further provides a computer device, comprising:

one or more processors, a memory for storing one or more programs, the one or more programs, when executed by said one or more processors, enable said one or more processors to implement the above-mentioned method for processing speech splicing and synthesis.

The present disclosure further provides a computer readable medium on which a computer program is stored, the program, when executed by a processor, implementing the above-mentioned method for processing speech splicing and synthesis.

According to a method and apparatus for processing speech splicing and synthesis, a computer device and a readable medium of the present disclosure, it is feasible to expand a speech library according to a pre-trained speech synthesis model and an obtained synthesized text, the speech library before the expansion comprising manually-collected original language materials; use the expanded speech library to perform speech splicing and synthesis processing. According to the technical solution of the present embodiment, the speech library is expanded so that the speech library includes sufficient language materials. As such, when speech splicing processing is performed according to the expanded speech library, it is possible to select more speech segments, and thereby improve coherence and naturalness of the effect of speech synthesis so that the speech synthesis effect is very coherent with very good naturalness and can sufficiently satisfy the user's normal use.

DETAILED DESCRIPTION OF PREFERRED EMBODIMENTS

The present disclosure will be described in detail with reference to figures and specific embodiments to make objectives, technical solutions and advantages of the present disclosure more apparent.

Figure 1:
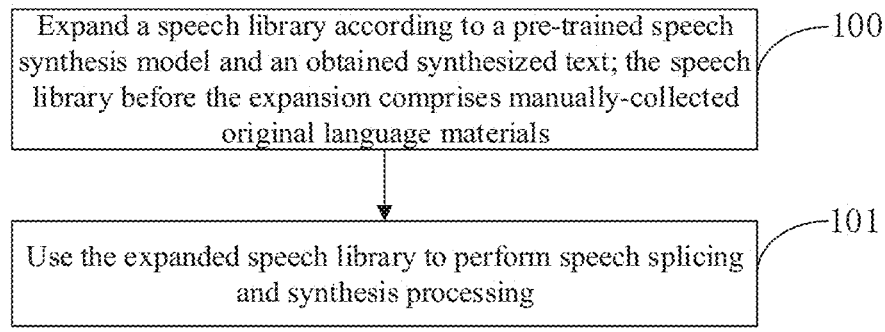
FIG. 1 is a flow chart of a first embodiment of a method for processing speech splicing and synthesis according to the present disclosure.

FIG. 1 is a flow chart of a first embodiment of a method for processing speech splicing and synthesis according to the present disclosure. As shown in FIG. 1, the method for processing speech splicing and synthesis according to the present embodiment may specifically include the following steps:

100: expanding a speech library according to a pre-trained speech synthesis model and an obtained synthesized text; the speech library before the expansion comprises manually-collected original language materials;

101: using the expanded speech library to perform speech splicing and synthesis processing.

A subject for executing the method for processing speech splicing and synthesis according to the present embodiment may be an apparatus for processing speech splicing and synthesis. The apparatus may perform expansion processing for the speech library which is needed upon speech splicing and synthesis, so that the speech library includes sufficient language materials to meet demands of the speech splicing technology, and therefore the expanded speech library may be used to perform speech splicing and synthesis processing.

In the present embodiment, the speech library is expanded according to a pre-trained speech synthesis model and an obtained synthesized text, so that the expanded speech library not only includes manually-collected original language materials, but also includes synthesized language materials resulting from synthesis according to the speech synthesis model and obtained synthesized text. As such, the content of language materials included in the expanded speech library may be rich enough, and subsequently the expanded speech library may be used to perform speech splicing and synthesis processing. Since the language materials in the expanded speech library are enough, it is possible to ensure that when the expanded speech library is used to perform speech splicing and syntheses processing, the speech synthesis effect is very coherent with very good naturalness, and sufficiently satisfy the user's normal use.

According to the method for processing speech splicing and synthesis of the present embodiment, it is possible to expand a speech library according to the pre-trained speech synthesis model and the obtained synthesized text, the speech library before the expansion comprising manually-collected original language materials; the expanded speech library is used to perform speech splicing and synthesis processing. According to the technical solution of the present embodiment, the speech library is expanded so that the speech library includes sufficient language materials. As such, when speech splicing processing is performed according to the expanded speech library, it is possible to select more speech segments, and thereby improve coherence and naturalness of the effect of speech synthesis so that the speech synthesis effect is very coherent with very good naturalness and can sufficiently satisfy the user's normal use.

Figure 2:
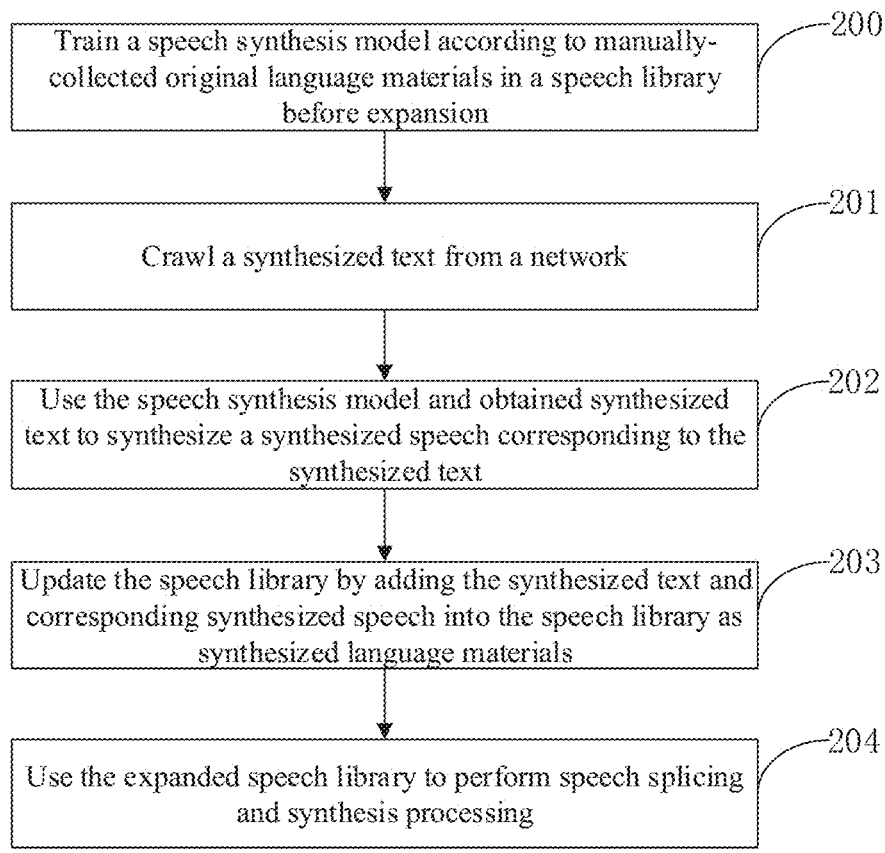
FIG. 2 is a flow chart of a second embodiment of a method for processing speech splicing and synthesis according to the present disclosure.

FIG. 2 is a flow chart of a second embodiment of a method for processing speech splicing and synthesis according to the present disclosure. As shown in FIG. 2, the method for processing speech splicing and synthesis according to the present embodiment, on the basis of the technical solution of the embodiment shown in FIG. 1, further introduce the technical solution of the present disclosure in more detail. As shown in FIG. 2, the method for processing speech splicing and synthesis according to the present embodiment may specifically comprise the following steps:

200: training a speech synthesis model according to manually-collected original language materials in a speech library before expansion;

201: crawling a synthesized text from a network;

202: using the speech synthesis model and obtained synthesized text to synthesize a synthesized speech corresponding to the synthesized text;

203: updating the speech library by adding the synthesized text and corresponding synthesized speech into the speech library as synthesized language materials;

Steps 202 to step 203 are a specific implementation mode of the step 100 of the embodiment shown in FIG. 1.

204: using the expanded speech library to perform speech splicing and synthesis processing.

Specifically, in the present embodiment, first, it is possible to manually collect partial original language materials, for example, the original language materials may include original texts and corresponding original speeches. The original language materials of the present embodiment are manually connected by an operator. For example, in the star speech synthesis scenario, the original speech in the original language materials is speech recorded by the star according to the provided original text. In the personalized synthesis scenario, the original language materials are speech recorded by the user himself or his relatives or friends according to the provided original text. Particularly, the process of the star recording original speech requires a high manpower cost, and is time-consuming and laborious, so only a smaller amount of data may be included when original language materials are collected in the present embodiment, for example, it is feasible to only collect original speech of one hour. The original speech in the original language material already contain features such as timbre of the corresponding speech articulator. In the present embodiment, it is possible to train the speech synthesis model according to the manually-collected raw language materials in the speech library, so that the speech synthesized by the speech synthesis model and the speech of the raw language materials have the same features such as timbre. As such, it is possible to enable the raw speech and the speech synthesized by the speech synthesis model to sound as being articulated by the same user.

For example, the speech synthesis model of the present embodiment may employ a WaveNet model. The WaveNet model is a model advanced by DeepMind group in 2016 and having a waveform modeling function. The WaveNet model has attracted extensive concerns from industrial and academic circles since it was advanced.

In the present embodiment, training the speech synthesis model according to the manually-collected raw language materials in the speech library may specifically be training the speech synthesis model according to the original text and corresponding original speech. For example, it is possible to first extract multiple training data from the original language materials, and each training data comprises a speech segment in the original speech and a corresponding text segment in the original text. Before training, an initial value is set for the parameter of the WaveNet model. When training is performed, it is possible to input text segments of respective training data in the WaveNet model, the WaveNet model outputting a synthesized speech segment according to the input text segments; then calculate a cross entropy of the speech segment and the speech segment of the training data; then adjust parameters of the WaveNet model by a gradient descent method so that the cross entropy reaches a minimal value, namely, this indicates that the speech segment synthesized by the WaveNet model is close enough to the speech segment of the training data. In the above manner, it is possible to employ multiple training data to constantly train the WaveNet model, determine parameters of the WaveNet model and thereby determine the WaveNet model. The training of the WaveNet model is completed.

In the manner stated in the above embodiment, it is possible to, after obtaining the speech synthesis model based on the WaveNet model, generate synthesized language materials based on the speech synthesis model to expand the speech library. Specifically, the synthesized text may be obtained first. Specifically, it is possible to obtain the synthesized text in conjunction with a field of use. For example, if the speech splicing and synthesis is used in the field of aviation, it is possible to obtain, form the network, a lot of texts in the field of aviation as a synthesized text. If the speech splicing is used in the field of artificial intelligence, it is possible to obtain, from the network, a lot of texts in the field of artificial intelligence as the synthesized text. If the speech splicing is used in the field of education, it is possible to obtain, from the network, a lot of texts in the field of education as the synthesized text. As for each field, it is possible to obtain, from the network, texts of a relevant subject as the synthesized text. Then, it is possible to input the obtained synthesized text into a duly-trained speech synthesis model which may synthesize to get a corresponding synthesized speech. The synthesized speech and the original speech in the original language materials have the same features such as timbre and should like the same articulator's speech. Finally, it is possible to update the speech library by adding the synthesized text and the corresponding synthesized speech, as synthesized language materials, into the speech library. The synthesized text of the present embodiment may be a whole text, or multiple texts. Furthermore, in the present embodiment, the amount of the synthesized speech is by far larger than the amount of the original speech. For example, if the original speech is in the amount of one hour, the synthesized speech may reach an amount of speech of up to 20 hours, even an amount of speech of more hours. As such, performing speech splicing and synthesis by using the updated speech library may satisfy more demands of speech splicing and synthesis, so that the synthesis result of speech splicing is relatively coherent with better naturalness and can satisfy more demands of practical application.

It may be known from the above depictions that the method for processing speech splicing and synthesis of the present embodiment is an offline synthesis capability of the speech synthesis model based on the Wavenet model. First, it is possible to use a small amount of data (e.g., recorded data of one hour) to build the speech synthesis model based on the WaveNet model, and then use the speech synthesis model to synthesize large-scale language materials with a 20-hour scale and with a high text coverage rate. Especially, in the present embodiment, it is also possible to, with respect to a specific scenario to which the synthesized speech is applied, add language materials which appear in the field with a high frequency. Finally, it is possible to use the 20-hour-scale language materials synthesized by the speech synthesis model based on the WaveNet model, to build the splicing and synthesis system. As the sound quality of speech synthesized by the speech synthesis model based on the WaveNet model is higher, the sound quality may reach the same sound quality as the manually-collected speech. Furthermore, since the scale of the speech library is expanded to a magnitude of 20 hours, it is possible to ensure that there are sufficient units for selection upon speech splicing and synthesis, and thereby ensure the synthesis result of speech splicing is relatively coherent with very good naturalness.

As compared with a conventional speech library in which only a small number of language materials are collected, the method for processing speech splicing and synthesis of the present embodiment may obviously improve the sound quality and smoothness of the synthesis result in the case of a small amount of data. When a star speech library is produced, the method for processing speech splicing and synthesis of the present embodiment may reduce the amount of star's recorded data and cut costs; when a personalized speech library is produced, it is possible to use a small amount of data provided by the user to synthesize high fidelity sound and improve the user's experience.

The method for processing speech splicing and synthesis of the present embodiment may quickly update the synthesis effect of a current commercial synthesis system (e.g., a speech synthesis system of each company) with a small amount of data. As the computing capability improves and the WaveNet model is optimized in the future, the WaveNet model may be directly deployed online at a certain time point.

The method for processing speech splicing and synthesis of the present embodiment can sufficiently use the modeling capability of WaveNet, can effectively avoid problems such as high computing costs, high latency and undesirable real time rate when WaveNet is directly used, and may prominently improve online synthesis effect in the case of a small amount of data.

Figure 3:
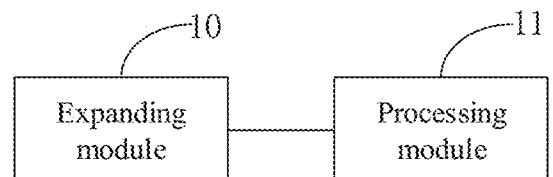
FIG. 3 is a structural diagram of a first embodiment of an apparatus for processing speech splicing and synthesis according to the present disclosure.

FIG. 3 is a structural diagram of a first embodiment of an apparatus for processing speech splicing and synthesis according to the present disclosure. As shown in FIG. 3, the apparatus for processing speech splicing and synthesis according to the present embodiment may specifically comprise:

an expanding module 10 configured to expand a speech library according to a pre-trained speech synthesis model and an obtained synthesized text; the speech library before the expansion comprises manually-collected original language materials;

a processing module 11 configured to use the speech library expanded by the expanding module 10 to perform speech splicing and synthesis processing.

Principles employed by the apparatus for processing speech splicing and synthesis according to the present embodiment to implement the speech splicing and synthesis processing by using the above modules and the resultant technical effects are the same as those of the above-mentioned method embodiments. For particulars, please refer to the depictions of the aforesaid relevant method embodiments, and no detailed depictions will be presented here.

Figure 4:
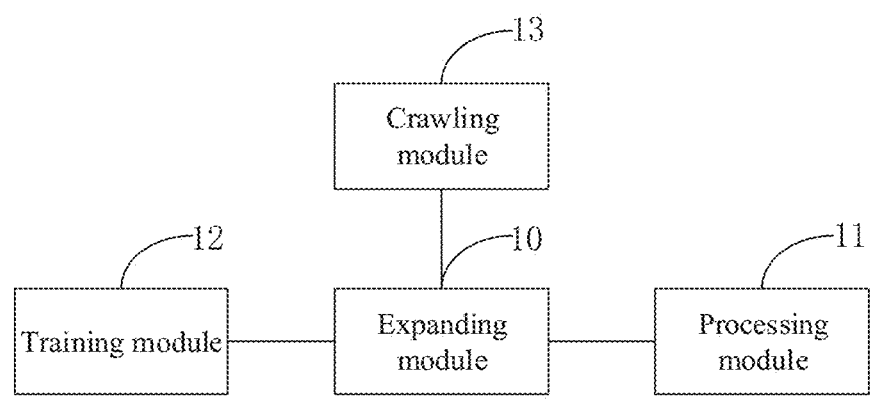
FIG. 4 is a structural diagram of a second embodiment of an apparatus for processing speech splicing and synthesis according to the present disclosure.

FIG. 4 is a structural diagram of a second embodiment of an apparatus for processing speech splicing and synthesis according to the present disclosure. As shown in FIG. 3, the apparatus for processing speech splicing and synthesis according to the present embodiment, on the basis of the technical solution of the embodiment shown in FIG. 3, further introduces the technical solution of the present disclosure in more detail.

In the apparatus for processing speech splicing and synthesis according to the present embodiment, the expanding module 10 is specifically configured to:

use the speech synthesis model and obtained synthesized text to synthesize a synthesized speech corresponding to the synthesized text;

update the speech library by adding the synthesized text and corresponding synthesized speech into the speech library as synthesized language materials.

Further optionally, as shown in FIG. 4, the apparatus for processing speech splicing and synthesis according to the present embodiment further comprises:

a training module 12 configured to train the speech synthesis model according to manually-collected original language materials in a speech library before expansion.

Further optionally, the original language materials may comprise original texts and corresponding original speeches;

the training module 12 is specifically configured to train the speech synthesis model according to the original texts and corresponding original speeches.

Correspondingly, the expanding module 10 is configured to expand the speech library according to the speech synthesis model pre-trained by the training module 12 and the obtained synthesized text.

Further optionally, as shown in FIG. 4, the apparatus for processing speech splicing and synthesis according to the present embodiment further comprises:

a crawling module 13 configured to crawl a synthesized text from a network.

Correspondingly, the expanding module 10 is configured to expand the speech library according to the speech synthesis model pre-trained by the training module 12 and the synthesized text obtained by the crawling module 13.

Further optionally, in the apparatus for processing speech splicing and synthesis according to the present embodiment, the speech synthesis model employs a WaveNet model.

Principles employed by the apparatus for processing speech splicing and synthesis according to the present embodiment to implement the speech splicing and synthesis processing by using the above modules and the resultant technical effects are the same as those of the above-mentioned method embodiments. For particulars, please refer to the depictions of the aforesaid relevant method embodiments, and no detailed depictions will be presented here.

Figure 5:
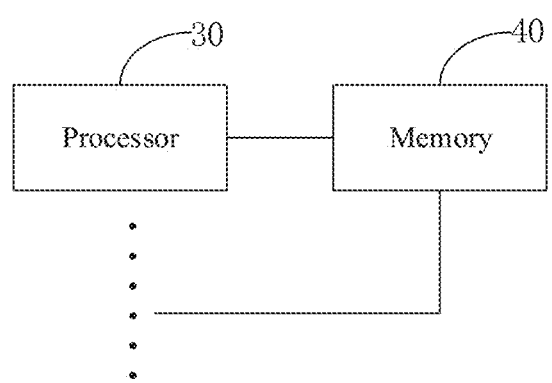
FIG. 5 is a structural diagram of an embodiment of a computer device according to the present disclosure.

FIG. 5 is a block diagram of an embodiment of a computer device according to the present disclosure. As shown in FIG. 5, the computer device according to the present embodiment comprises: one or more processors 30, and a memory 40 for storing one or more programs; the one or more programs stored in the memory 40, when executed by said one or more processors 30, enable said one or more processors 30 to implement the method for processing speech splicing and synthesis of the embodiments shown in FIG. 1-FIG. 2. The embodiment shown in FIG. 5 exemplarily includes a plurality of processors 30.

Figure 6:
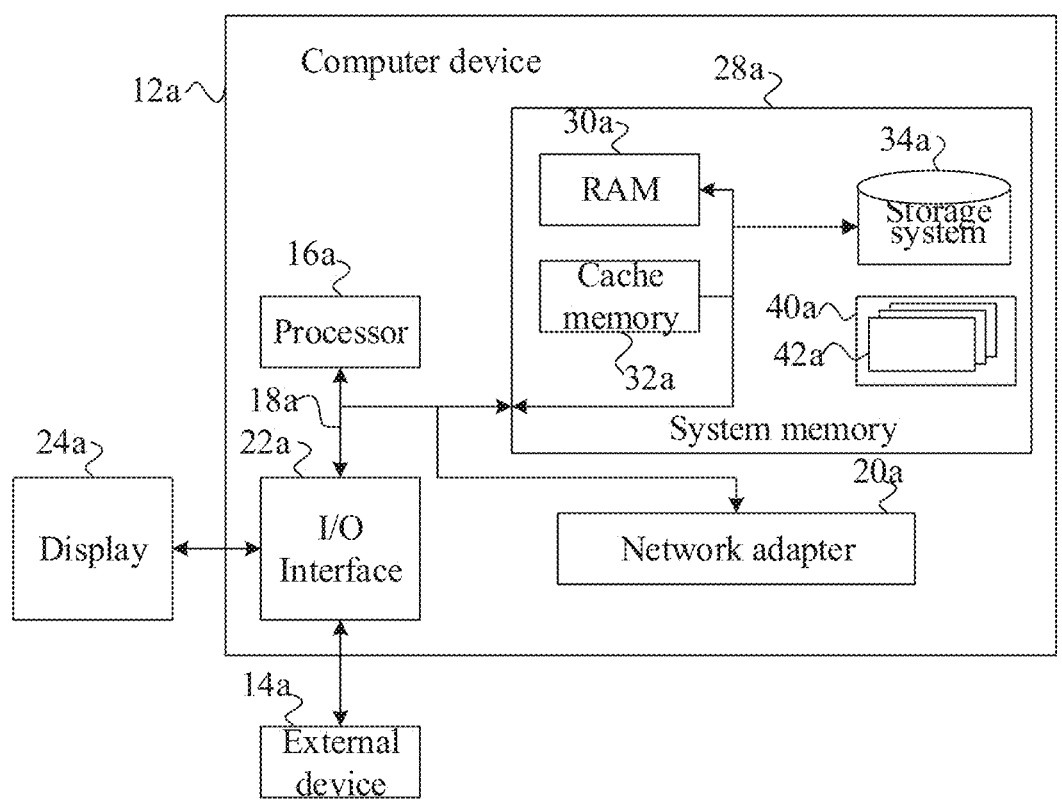
FIG. 6 is an example diagram of a computer device according to the present disclosure.

For example, FIG. 6 is an example diagram of a computer device according to an embodiment of the present disclosure. FIG. 6 shows a block diagram of an example computer device 12a adapted to implement an implementation mode of the present disclosure. The computer device 12a shown in FIG. 6 is only an example and should not bring about any limitation to the function and scope of use of the embodiments of the present disclosure.

As shown in FIG. 6, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34*a* can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18*a* by one or more data media interfaces. The system memory 28*a* may include at least one program product having a set (e.g., at least one) of program modules that are configured to carry out the functions of embodiments shown in FIG. 1-FIG. 4 of the present disclosure.

Program/utility 40*a*, having a set (at least one) of program modules 42*a*, may be stored in the system memory 28*a* by way of example, and not limitation, as well as an operating system, one or more disclosure programs, other program modules, and program data. Each of these examples or a certain combination thereof might include an implementation of a networking environment. Program modules 42*a* generally carry out the functions and/or methodologies of embodiments shown in FIG. 1-FIG. 4 of the present disclosure.

Computer device 12*a* may also communicate with one or more external devices 14*a* such as a keyboard, a pointing device, a display 24*a*, etc.; with one or more devices that enable a user to interact with computer device 12*a*; and/or with any devices (e.g., network card, modem, etc.) that enable computer device 12*a* to communicate with one or more other computing devices. Such communication can occur via Input/Output (I/O) interfaces 22*a*. Still yet, computer device 12*a* can communicate with one or more networks such as a local area network (LAN), a general wide area network (WAN), and/or a public network (e.g., the Internet) via network adapter 20*a*. As depicted in FIG. 5, network adapter 20*a* communicates with the other communication modules of computer device 12*a* via bus 18*a*. It should be understood that although not shown, other hardware and/or software modules could be used in conjunction with computer device 12*a*. Examples, include, but are not limited to: microcode, device drivers, redundant processing units, external disk drive arrays, RAID systems, tape drives, and data archival storage systems, etc.

The processor 16*a* executes various function applications and data processing by running programs stored in the system memory 28*a*, for example, implements the method for processing speech splicing and synthesis shown in the above embodiments.

The present disclosure further provides a computer readable medium on which a computer program is stored, the program, when executed by a processor, implementing the method for processing speech splicing and synthesis shown in the above embodiments.

The computer readable medium of the present embodiment may include RAM30*a*, and/or cache memory 32*a* and/or a storage system 34*a* in the system memory 28*a* in the embodiment shown in FIG. 6.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for processing speech splicing and synthesis, wherein the method comprises:
   expanding a speech library using a text for expansion and a corresponding synthesized speech which is obtained with a speech synthesis model and the text for expansion, wherein the speech library before the expansion comprises manually-collected original speeches along with corresponding original texts; and wherein the speech synthesis model is trained with the original speeches and the corresponding original texts in the speech library before the expansion; and
   using the expanded speech library to perform speech splicing and synthesis processing.

2. The method according to claim 1, wherein the expanding a speech library using a text for expansion and a corresponding synthesized speech comprises:
   updating the speech library by adding the text for expansion and corresponding synthesized speech into the speech library.

3. The method according to claim 1, wherein the text for expansion is obtained by
   crawling the synthesized text from a network.

4. The method according to claim 1, wherein the speech synthesis model employs a WaveNetmodel.

5. The method according to claim 1, wherein the original speeches are obtained from a same specific person having voice features, and the synthesized speech which is obtained with the speech synthesis model and the text for expansion has the same voice features as the specific person.

6. The method according to claim 5, wherein a plurality of texts for expansion and correspondingly a plurality of synthesized speeches which are obtained with the speech synthesis model and the plurality of texts are used to expand the speech library.

7. The method according to claim 4, wherein the speech synthesis model is trained by inputting an original text of the original texts to the WaveNet model, and adjusting parameters of the WaveNet model according to an output of the WaveNet model and an original speech of the original speeches corresponding to the original text inputted to the WaveNet model, so as to determine parameters of the WaveNet model.

8. The method according to claim 1, wherein the text for expansion is a text outside the speech library before the expansion.

9. A computer device, wherein the device comprises:
   one or more processors,
   a memory for storing one or more programs,
   the one or more programs, when executed by said one or more processors, enable said one or more processors to implement a method for processing speech splicing and synthesis, wherein the method comprises:
   expanding a speech library using a text for expansion and a corresponding synthesized speech which is obtained with speech synthesis model and the text for expansion; wherein the speech library before the expansion comprises manually-collected original speeches along with corresponding original texts; and wherein the speech synthesis model is trained with the original speeches and the corresponding original texts in the speech library before the expansion; and
   using the expanded speech library to perform speech splicing and synthesis processing.

10. The computer device according to claim 9, wherein the original speeches are obtained from a same specific person having voice features, and the synthesized speech which is obtained with the speech synthesis model and the text for expansion has the same voice features as the specific person.

11. The computer device according to claim 10, wherein a plurality of texts for expansion and correspondingly a plurality of synthesized speeches which are obtained with the speech synthesis model and the plurality of texts are used to expand the speech library.

12. The computer device according to claim 9, wherein the speech synthesis model employs a WaveNetmodel.

13. The computer device according to claim 12, wherein the speech synthesis model is trained by inputting an original text of the original texts to the WaveNet model, and adjusting parameters of the WaveNet model according to an output of the WaveNet model and an original speech of the original speeches corresponding to the original text inputted to the WaveNet model, so as to determine parameters of the WaveNet model.

14. The computer device according to claim 9, wherein the text for expansion is a text outside the speech library before the expansion.

15. A non-transitory computer readable medium on which a computer program is stored, wherein the program, when executed by a processor, implements a method for processing speech splicing and synthesis, wherein the method comprises:
   expanding a speech library using a text for expansion and a corresponding synthesized speech which is obtained with a speech synthesis model and the text for expansion; wherein the speech library before the expansion comprises manually-collected original speeches along with corresponding original texts; and wherein the speech synthesis model is trained with the original speeches and the corresponding original texts in the speech library before the expansion; and
   using the expanded speech library to perform speech splicing and synthesis processing.

16. The non-transitory computer readable medium according to claim 15, wherein the original speeches are obtained from a same specific person having voice features, and the synthesized speech which is obtained with the speech synthesis model and the text for expansion has the same voice features as the specific person.

17. The non-transitory computer readable medium according to claim 16, wherein a plurality of texts for expansion and correspondingly a plurality of synthesized speeches which are obtained with the speech synthesis model and the plurality of texts are used to expand the speech library.

18. The non-transitory computer readable medium according to claim 15, wherein the speech synthesis model employs a WaveNetmodel.

19. The non-transitory computer readable medium according to claim 18, wherein the speech synthesis model is trained by inputting an original text of the original texts to the WaveNet model, and adjusting parameters of the WaveNet model according to an output of the WaveNet model and an original speech of the original speeches corresponding to the original text inputted to the WaveNet model, so as to determine parameters of the WaveNet model.

20. The non-transitory computer readable medium according to claim 15, wherein the text for expansion is a text outside the speech library before the expansion.

\* \* \* \* \*